W. S. & E. H. Shoemaker,

R.R. Spike.

No. 97,239.    Patented Nov. 23, 1869.

Witnesses.
R. J. Campbell
Julius Hirsch

Inventor
W. S. Shoemaker
E. H. Shoemaker
by
Mason, Fenwick & Lawrence

United States Patent Office.

W. S. SHOEMAKER, OF TOWSONTOWN, MARYLAND, AND E. H. SHOEMAKER, OF COLUMBUS, OHIO.

Letters Patent No. 97,239, dated November 23, 1869.

IMPROVEMENT IN RAILROAD-SPIKES.

The Schedule referred to in these Letters Patent and making part of the same.

*To all whom it may concern:*

Be it known that we, W. S. SHOEMAKER, of Towsontown, in the county of Baltimore, and State of Maryland, and E. H. SHOEMAKER, of Columbus, in the county of Franklin, and State of Ohio, have invented a new and improved Railroad-Spike; and we do hereby declare that the following is a full, clear, and exact description thereof, reference being had to the accompanying drawings, making part of this specification, in which—

Figure 1:
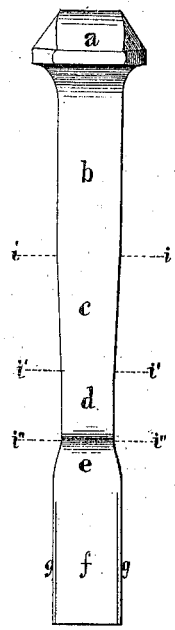
Figure 2:
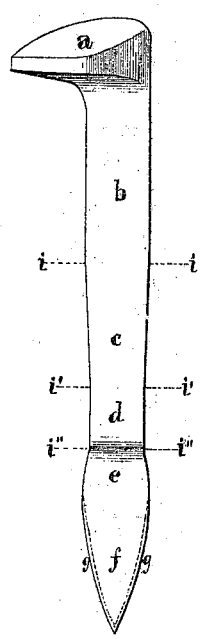
Figure 3:
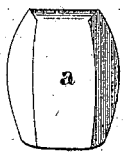
Figure 4:
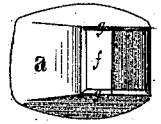

Figure 1 is an edge view of our improved spike;
Figure 2 is a side view of the spike;
Figure 3 is a top view; and
Figure 4 is a bottom view.

Similar letters of reference indicate corresponding parts in the several figures.

The object of this invention is to improve railroad-spikes, so that the jarring and concussions, by trains passing over the rails, will not cause the spikes to work loose or start from their places; at the same time, to provide for strengthening the spikes at such points as will sustain them from breaking during the act of drawing them from the cross-ties.

The nature of our invention consists in reducing the shank of a rail-spike, at a point between its entering-end and head, so as to form concave surfaces above a swelled entering-end, about which surfaces the wood into which the spike is driven will contract, and firmly hold the spike down in its place, as will be hereinafter explained.

To enable others skilled in the art to understand our invention, we will describe its construction and operation.

The head $a$ of the spike, and its shank $b$, down to the point $i$, may be made in the usual well-known manner.

From the point $i$, each of the four sides $c$ of the shank taper down to the point $i'$, and from this point to the point $i''$, the sides $d$ of the shank are parallel to each other.

From the point $i''$, the spike is swelled on all sides, and this swell is terminated by the double bevelled entering-end $f$, having fins, $g\,g$, formed on it, as shown in figs. 1, 2, and 4.

In the act of driving this spike into timber, the fibres will be crowded asunder, all around the swelled portion of the entering-end. When the spike is driven home, the fibres will shrink about the contracted neck $d$ and tapered surfaces $c$, and afford a firm hold.

It will be observed that we do not form acute angles upon the sides of the spike, as these would tear the fibres of the wood; but we form the contraction of the shank by gradual lines, from $i$ to $i'$, and produce rounded shoulders below the neck $d$, which will prevent the casual loosening of the spike, and also the breaking down of the fibres, during the act of driving, as well as withdrawing the spike.

By having the surfaces $d$, from $i'$ to $i''$, parallel, it is obvious that the spike will be much less liable to become loose than it would be if the tapered lines or surfaces $c$ were continued down to the shoulder at $i''$.

This contracted portion, from $i$ to $i''$, of the spike, will be about one inch in length, and will allow a large body of wood to hug around the spike, above the shoulders $e$, so that in drawing the spike out of the wood about the parallel surfaces $d$, about one inch, before the spike will begin to become loose; or, in other words, the spike must be drawn about an inch out of the wood before it will begin to loosen.

We are aware that railroad-spikes, having indentations or corrugations in their sides, have been used prior to our invention; but we are not aware that a spike, having the form and possessing the capabilities of the one above described, has ever been known or used prior to our invention.

We do not claim a spike, such as is shown in the patent granted to William Ballard, July, 17, 1841, nor such as is shown in the rejected application of G. W. McGill, August 21, 1866, and of Postawka, December 1, 1866, as such construction of spikes cannot be withdrawn from the wood without tearing away the wood, and thereby destroying, in a great degree, the articles into which they are driven.

What we claim as new, and desire to secure by Letters Patent, is—

1. A railroad-spike, having a tapered portion, $c$, a rounded shoulder, $e$, and a double bevelled entering-end, $f$, substantially as described.

2. The tapered sides $c$, parallel sides $d$, shoulder $e$, and double bevelled entering-end $f$, with or without the fins $g$, substantially as described.

3. As a new and improved article of manufacture, a railroad-spike, constructed as herein shown and described.

W. S. SHOEMAKER.
E. H. SHOEMAKER.

Witnesses for W. S. SHOEMAKER:
  JAMES MILLER,
  W. M. SHOEMAKER.

Witnesses for E. H. SHOEMAKER:
  ED. LILLY,
  HENRY MEISER.